US008143752B2

(12) United States Patent  (10) Patent No.: US 8,143,752 B2
Altindis  (45) Date of Patent: Mar. 27, 2012

(54) ELECTRIC MOTOR HAVING ELECTRICAL CONNECTING ELEMENTS FOR CONNECTION TO WINDING LEADS

(75) Inventor: Ismail Altindis, Furtwangen (DE)

(73) Assignee: EBM-Papst St. Georgen GmbH & Co., St. Georgen (DE)

( * ) Notice: Subject to any disclaimer, the term of this patent is extended or adjusted under 35 U.S.C. 154(b) by 0 days.

(21) Appl. No.: 12/445,289

(22) PCT Filed: Oct. 10, 2007

(86) PCT No.: PCT/EP2007/008792
§ 371 (c)(1),
(2), (4) Date: Apr. 11, 2009

(87) PCT Pub. No.: WO2008/043534
PCT Pub. Date: Apr. 17, 2008

(65) Prior Publication Data
US 2010/0019592 A1  Jan. 28, 2010

(30) Foreign Application Priority Data
Oct. 14, 2006 (DE) .................... 20 2006 016 357 U

(51) Int. Cl.
H02K 11/00 (2006.01)
H02K 15/085 (2006.01)
H01R 12/51 (2011.01)
H01R 12/53 (2011.01)
H01R 12/55 (2011.01)

(52) U.S. Cl. ............ 310/71; 310/216.004; 310/216.005

(58) Field of Classification Search ............ 310/71, 310/216.004, 216.005, 261; H02K 3/52, H02K 15/85, 11/00; H01R 12/34, 12/53, H01R 12/55, 12/51

See application file for complete search history.

(56) References Cited

U.S. PATENT DOCUMENTS
4,633,110 A   12/1986   Genco .............................. 310/71
(Continued)

FOREIGN PATENT DOCUMENTS
AU   2003-208 364   10/2003
(Continued)

OTHER PUBLICATIONS
Machine translation of Veigel 102004060084.*
(Continued)

*Primary Examiner* — Quyen Leung
*Assistant Examiner* — Terrance Kenerly
(74) *Attorney, Agent, or Firm* — Milton Oliver, Esq.; Oliver Intellectual Property LLC

(57) ABSTRACT

An electric motor has a rotor (52) and a stator (60) equipped with salient poles on each of which is provided a winding (88 to 99), which windings together form a winding arrangement (85'), electrical connecting leads (88' to 99') being provided between at least some of the windings. The stator (60) further has electrical connecting elements (108 to 119) that are arranged on at least one insulating carrier (102) and are equipped with contact elements (108" to 119") and with mounting elements (108"" to 119""), which latter serve for electrical and mechanical connection to the connecting leads (88' to 99'). The use of a printed circuit board (140) formed with press-fit seats, to receive the contact elements, facilitates rapid, secure and automated connection of stator windings to other circuit parts, which is particularly useful in making low-voltage, high-current motors such as those used in mining.

13 Claims, 12 Drawing Sheets

U.S. PATENT DOCUMENTS

| | | | |
|---|---|---|---|
| 4,763,408 A | 8/1988 | Heisey | 29/874 |
| 5,635,781 A | 6/1997 | Moritan | 310/71 |
| 5,934,600 A * | 8/1999 | Darceot | 242/433 |
| 6,177,741 B1 | 1/2001 | Lutkenhaus et al. | 310/71 |
| 7,196,443 B2 * | 3/2007 | Kimura et al. | 310/71 |
| 7,582,999 B2 * | 9/2009 | Atkinson | 310/179 |
| 2007/0296292 A1 | 12/2007 | Kienzler et al. | |

FOREIGN PATENT DOCUMENTS

| | | | |
|---|---|---|---|
| DE | 197 40 938 | | 3/1999 |
| DE | 102 29 606 A | | 1/2001 |
| DE | 10325134 | * | 12/2004 |
| DE | 10 2004 060 084 | | 6/2006 |
| DE | 10 2004 052 816 | | 7/2006 |
| JP | 08-182 236 A | | 7/1996 |
| WO | 03-081 755 | | 10/2003 |
| WO | WO2005050818 | * | 6/2005 |
| WO | WO 2006-050 765 | | 5/2006 |
| WO | WO2006050765 | * | 5/2006 |
| WO | 2006-103 194 | | 10/2006 |

OTHER PUBLICATIONS

Machine translation of Keinzler May 2006, WO2006050765.*

* cited by examiner

ELECTRIC MOTOR HAVING ELECTRICAL CONNECTING ELEMENTS FOR CONNECTION TO WINDING LEADS

CROSS-REFERENCE

This application is a sec. 371 of PCT/EP07/08792, filed 10 Oct. 2007 and published 17 Apr. 2008 as WO 2008-43534-A1, which claims priority from DE 20 2006 016 357.3, filed 14 Oct. 2006, the entire content of which is incorporated by reference.

FIELD OF THE INVENTION

The invention relates to an electric motor having a stator that carries a winding arrangement that is configured to generate a rotating field.

BACKGROUND

A three-phase motor (rotary current motor) can be operated in a Y circuit configuration (Y configuration) and in a delta configuration. If, in the context of a Y circuit, the individual windings of each phase are connected in series, this is referred to as a "Y series" circuit; and if two individual windings per phase are connected in parallel, this is referred to as a "Y double-parallel" circuit, If four individual windings are connected in parallel, the term used is a "Y quadruple-parallel" circuit. Analogously, the terms "delta series" circuit and "delta double-parallel" circuit (see FIG. 3) are used, or a "delta quadruple-parallel" circuit is referred to.

The winding ends of the individual coils must be connected to one another in different ways, in order to manufacture the various circuit configurations of this kind. In the case of the motor according to U.S. Pat. No. 6,177,741 B1, Lütkenhaus et al, for example, the stator of which is equipped with a Y circuit, the ends of the lacquered copper wires are connected, by means of soldered or crimped connections, to the ends of flat conductive tracks that are mounted on an insulating plate. One of these conductive tracks serves as a neutral-point connector, and three other conductive tracks serve as the terminals for the U, V, and W phases. This requires a great deal of manual work.

SUMMARY OF THE INVENTION

It is therefore an object of the invention to make available a novel electric motor whose assembly requires much less manual work.

According to the invention, this object is achieved by a motor having a plurality of poles, each equipped with a stator winding. Each stator winding engages a mounting element on an electrical connecting element which makes contact with a respective receiving opening formed in a connecting arrangement, e.g. a printed circuit board. Preferably, the motor circuit is assembled in an automated manner by pressing all the contact elements into the receiving openings more or less simultaneously.

In accordance therewith, the winding ends of the individual windings can easily be connected to the mounting elements of the associated connecting elements, for example by resistance welding, with the result that low contact resistance values are obtained. The connecting elements can in turn be electrically connected in the desired fashion by means of a functionally appropriate connecting arrangement in order to obtain, for example, a Y double-parallel circuit or a delta quadruple-parallel circuit. A connecting arrangement of this kind can be implemented as a connecting board having electrical conductors, each of which is connected to specific associated connecting elements by means of contact elements such as, for example, press-in pins or contact pins, so that low contact resistance values are obtained here as well. These press-in pins can quickly and easily be pressed into corresponding press-in seats in the connecting board.

The invention thus enables rapid, uncomplicated, and highly automated production of high-quality stators that can be used at high ambient temperatures and/or high current intensities and/or in a context of severe vibration stress. One preferred application is motors for low operating voltages such as those that must be used for safety reasons in mining, where such motors are subject to particularly severe vibration stress and at the same time a high level of operating reliability is demanded.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
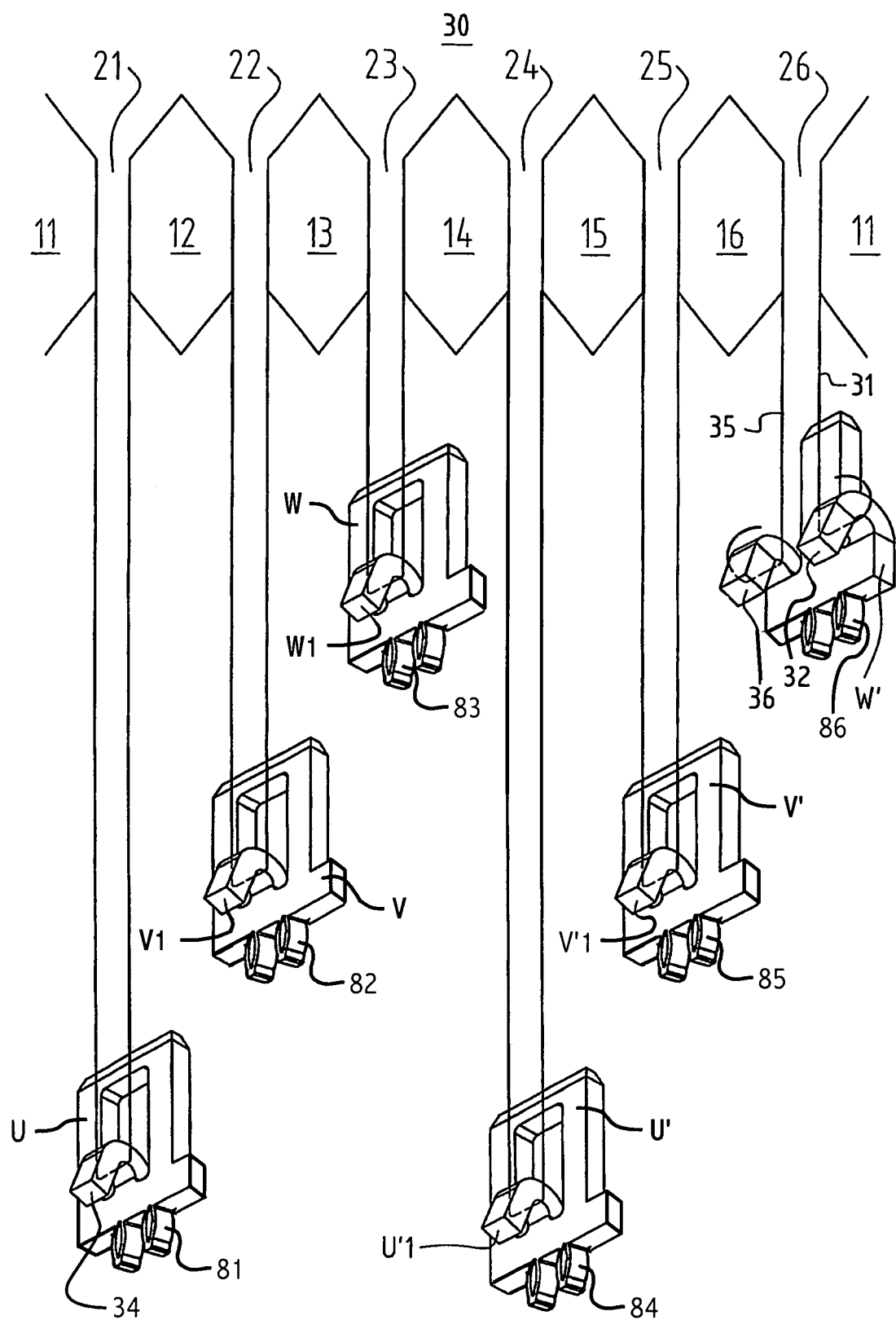
FIG. 1 is a usual depiction of a stator having a winding arrangement, and having connecting elements according to the present invention.

In the description that follows, the terms "left," "right," "upper," and "lower" refer to the respective figure of the drawings, and can vary from one figure to the next as a function of a particular orientation (portrait or landscape) that is selected. Identical or identically functioning parts are labeled with the same reference characters in the various figures, and usually are described only once.

FIGS. 1 to 4 show a first exemplifying embodiment of the invention, namely a motor having six salient stator poles 11' to 16' onto which six coils 11 to 16 are wound continuously and codirectionally. The slot between poles 11' and 12' is labeled 21, the slot between poles 12' and 13' is labeled 22, and so on for slots 23 to 26.

Figure 3:
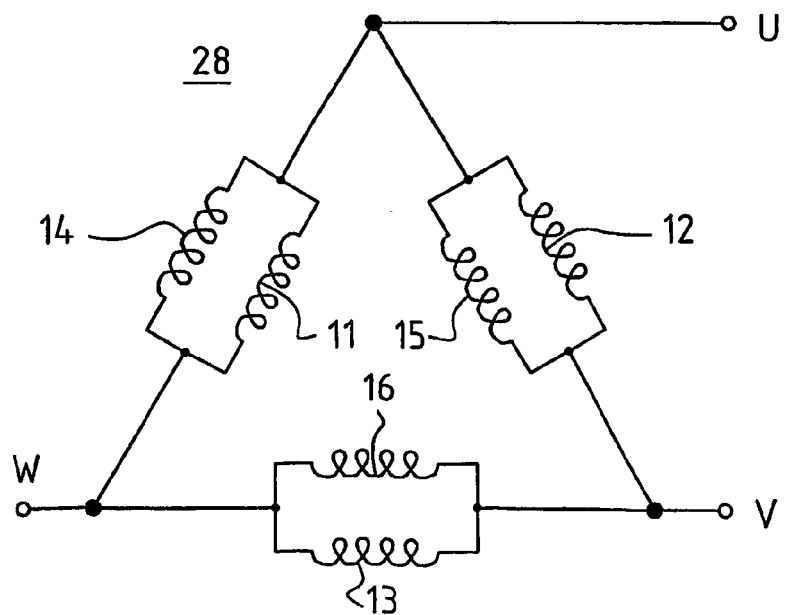
FIG. 3 depicts a delta double-parallel circuit.

This continuous winding 30 is intended for a delta double-parallel circuit 28 as depicted in the usual way in FIG. 3.

According to FIG. 1, the continuous winding 30 starts at its beginning 31 at hook 32 of an electrical connecting element W', then goes to coil 11, one of whose halves is shown on the right in FIG. 1 and the other half on the left, proceeds to a hook 34 of a connecting element U, then goes on to a coil 12 and from that to a hook V1 of a connecting element V and from there on to coil 13.

From coil 13, the continuous winding 30 goes to a hook W1 of a connecting element W, from there to coil 14, and from that on to a hook U'1 of a connecting element U'.

From there the continuous winding 30 proceeds to coil 15, and from that on to a hook V'1 of a connecting element V'.

From there the continuous winding 30 proceeds to coil 16, and from there its end 35 goes to a hook 36 of connecting element W', with which the circuit closes, since hooks 32 and 36 are electrically connected to one another via connecting element W'.

At each connecting element U, U', V, V', W, and W', one contact element 81, 82, 83, 84, 85, and 86 is provided for illustration. This element serves for the electrical connection of different connecting elements, as described below with reference to FIG. 15. Contact elements 81, 82, 83, 84, 85, and 86 are depicted in FIG. 1, by way of example, as resilient press-in pins, each contact element comprising two such press-in pins. The number of press-in pins depends on the current that is to be transmitted through them; it is generally the case that a single press-in pin can be sufficient for low currents, whereas at least two press-in pins are necessary for higher currents. It is noted, however, that the press-in pins are depicted merely as an example for the implementation of contact elements 81, 82, 83, 84, 85, and 86. Other implementations such as, for example, contact pins can also be carried out, and may be specified, depending upon the industrial application for which a relevant motor is used.

Figure 2:
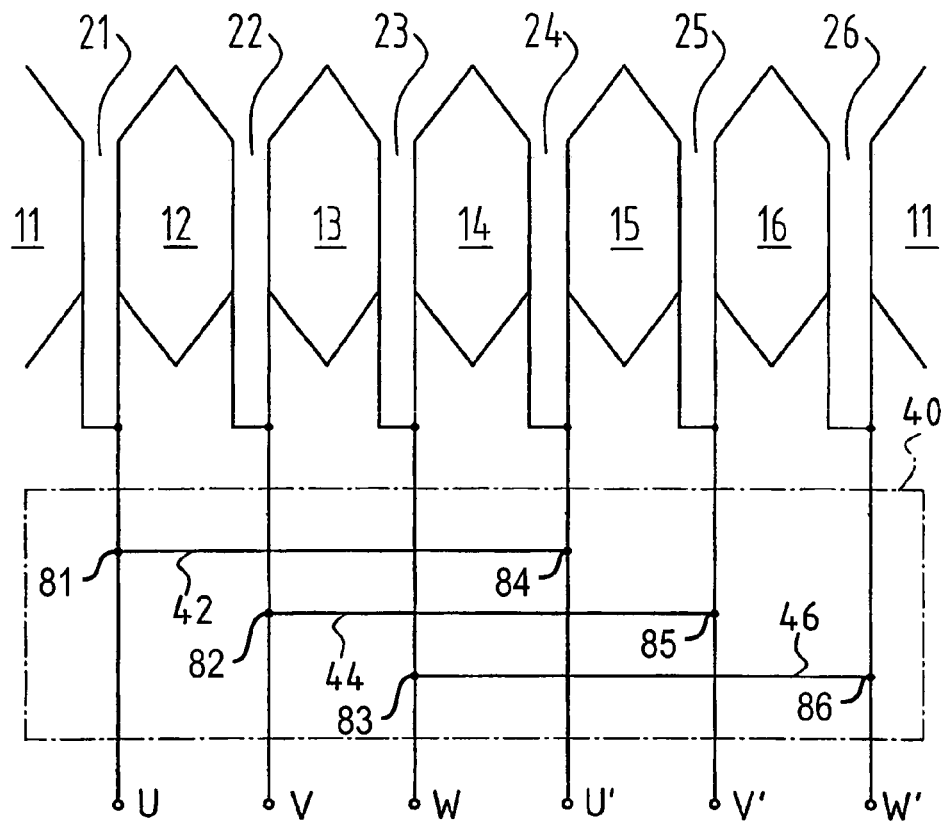
FIG. 2 is a depiction analogous to FIG. 1, with a connecting arrangement according to the present invention.

The arrangement depicted in FIG. 1 is merely an intermediate product for the manufacture of the delta double-parallel circuit 28 according to FIG. 3. FIG. 2 shows how manufacture of the circuit is completed by way of a connecting arrangement 40. Connecting arrangement 40 has a connection 42 for electrical connection of connecting elements U and U' of FIG. 1 via contact elements 81 and 84, as well as a connection 44 for electrical connection of connecting elements V and V' of FIG. 1 via contact elements 82 and 85, and a connection 46 for the connection of connecting elements W and W' of FIG. 1 via contact elements 83 and 86. A preferred configuration of connections 42, 44, 46 is described below.

Figure 4:
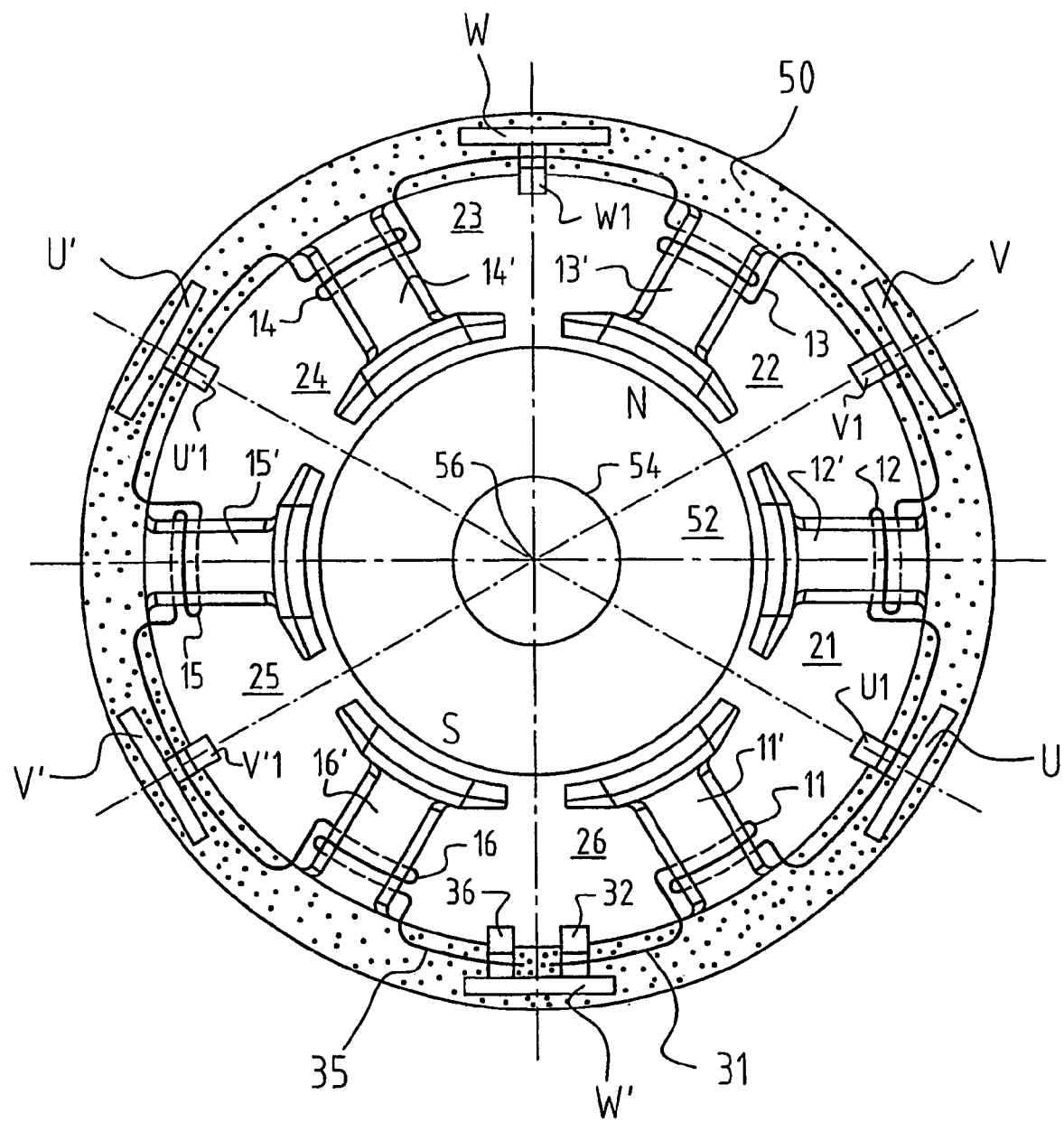
FIG. 4 depicts a stator having six slots and six teeth, as well as the winding arrangement according to FIGS. 1 to 3 arranged thereon.

As shown in FIG. 1, connecting elements U, U', V, V', W, and W' are mounted on an insulating ring 50 that is highlighted by a dot pattern in FIG. 4. FIG. 4 also shows a rotor 52 and its shaft 54, as well as rotation axis 56 around which rotor 52 rotates.

The latter is depicted as a two-pole permanent-magnet rotor corresponding to operation as a synchronous motor or three-phase generator, but it is of course also possible to use a rotor having a short-circuit winding, or an eddy-current rotor, in order to enable operation as an asynchronous machine.

Ring 50 is located at one end of the stator and concentrically with rotation axis 56, so that connecting elements U, U', V, V', W, and W' are at approximately the same distance from rotation axis 56.

Examples of embodiments of the motor according to FIGS. 1 to 4 are also described in our WO 2006/050765 A1, KIENZLER, ALTINDIS, WEISSER & MAIER, (commonly assigned with the present application) whose US National Phase is Ser. No. 11/718,800, published 27 Dec. 2007 as US 2007/0296292-A.

Figure 5:
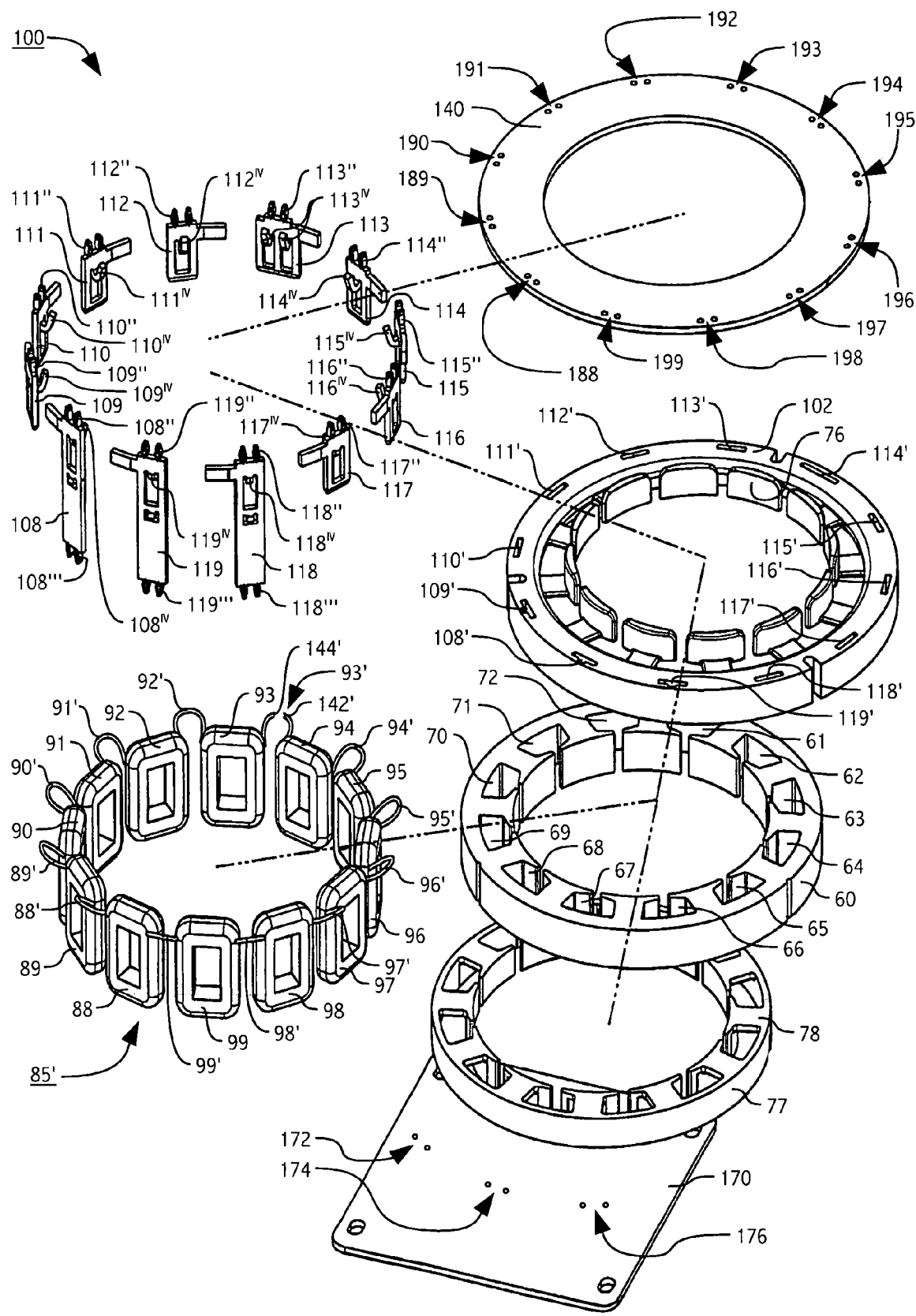
FIG. 5 is an exploded depiction of a stator having twelve coils and corresponding connecting elements, according to a preferred implementation of the invention.

FIG. 5 is an exploded perspective depiction of a stator 100 having a completely stacked stator lamination stack 60 having slots 61 to 72, the lamination division principle of which has already been described with reference to FIG. 4. Slots 61 to 72 of lamination stack 60 are lined, in the usual fashion, with an insulator.

In contrast to FIG. 4, stator lamination stack 60 of FIG. 5 comprises twelve coils 88 to 99 with which this lamination stack 60 is wound, preferably, using a single winding wire. These twelve coils are, by way of example, connected in a winding arrangement 85' to form a delta quadruple-parallel circuit. For this purpose, during stacking at least some of coils 88 to 99 are connected to one another via corresponding connecting leads. In FIG. 5, coils 88 to 99 are connected to one another, illustratively, via associated connecting leads 88' to 99'; coils 88 and 89 are connected to one another via lead 88', coils 89 and 90 via lead 89', etc.

As is evident from FIG. 5, connecting lead 93' is split approximately in the middle and comprises a first end 142' and a second end 144'. The latter are mounted, separately from one another, on the two hooks forming mounting element $113^{IV}$, as described below with reference to FIG. 10.

Located at the lower (in FIG. 5) end of lamination stack 60 is an annular insulating molded part 77 that forms parts 78 of the coil formers for the individual coils. Located at an upper (in FIG. 5) end of lamination stack 60 is an annularly implemented carrier 102 on which, once again, parts 76 of the coil formers for the individual coils or individual windings are provided. Carrier 102 is also shown as having axial openings 108' to 119' for the reception of electrical connecting elements 108 to 119. These are illustrated at greatly enlarged scale in FIG. 10.

Arranged in opening 113' is connecting element 113, which is equipped with a contact element 113" and is implemented analogously with connecting element W' of FIG. 1. Arranged in openings 109' to 112' and 114' to 117' are connecting elements 109' to 112' and 114' to 117', respectively, which are equipped with contact elements 109" to 112" and 114" to 117" and are implemented analogously with connecting elements U, U', V, V', and W of FIG. 1. A greatly enlarged perspective view of connecting element 114 is provided, by way of example in FIG. 11. Connecting elements 108, 118, and 119, equipped with contact elements 108", 118", and 119" respectively, are arranged in openings 108', 118', and 119'. A greatly enlarged perspective view of connecting element 108 is provided, by way of example, in FIG. 14.

Contact elements 108" to 119" are depicted in FIG. 5, by way of example, as resilient press-in pins. Upon assembly, these are introduced into associated receiving elements 188 to 199 of a connecting arrangement 140 that is preferably implemented as a circuit board, and are then connected there to corresponding electrical conductors as described with reference to FIG. 15.

Receiving elements 188 to 199 are preferably implemented as press-in seats into which the corresponding press-in pins are pressed. This creates a stable, pull-resistant connection between contact elements 108″ to 119″ and connecting arrangement 140, which connection serves, for example, for the electrical connection of different coils in order to produce the delta quadruple-parallel circuit configuration of stator 100.

As is evident from FIG. 5, connecting elements 108, 118, and 119 comprise, on their lower (in FIG. 5) sides, additional contact elements 108‴, 118‴, and 119‴, respectively. These serve for electrical connection of winding arrangement 85' to a supply voltage source (e.g. a three-phase current system or an output stage) via a further connecting arrangement 170 implemented as a circuit board, on which arrangement other electronic components of the motor electronics can also be arranged. Analogously to contact elements 108″ to 119″, contact elements 108‴, 118‴, and 119‴ are implemented as press-in pins that are pressed into receiving elements 172, 174, and 176, implemented as press-in seats, in connecting arrangement 170. A stable, pull-resistant connection of contact elements 108‴, 118‴, and 119‴ to connecting arrangement 170 is thereby created.

As FIG. 5 shows, connecting elements 108 to 119 comprise hook-shaped mounting elements $108^{IV}$ to $119^{IV}$ into which connecting leads 88' to 99' are hooked. Connecting lead 88' is hooked into hook $108^{IV}$, lead 89' into hook $109^{IV}$, etc. Leads 88' to 99' are mechanically and electrically connected to the associated hooks $108^{IV}$ to $119^{IV}$ by resistance welding. This is described with reference to FIGS. 11 to 13.

Figure 6:
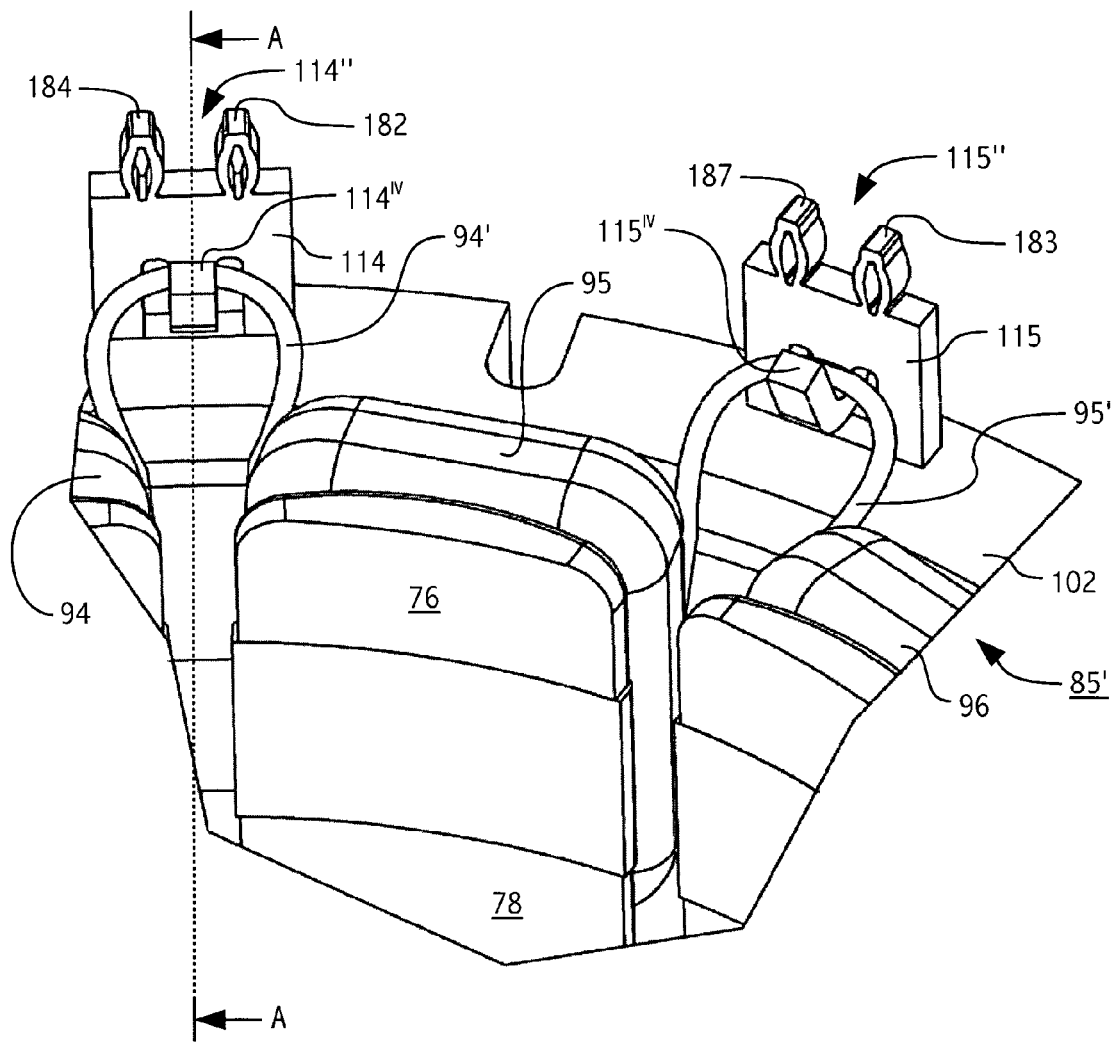
FIG. 6 is a perspective depiction of a portion of the stator of FIG. 5 having two connecting elements, after winding of the winding arrangement.

FIG. 6 is a perspective depiction of a greatly enlarged portion of stator 100 of FIG. 5, having connecting elements 114 and 115, after the winding of winding arrangement 85', of which only individual windings 94, 95, and 96 are at least partly visible in FIG. 6.

FIG. 6 illustrates the mounting of connecting elements 114 and 115 in carrier 102, and the hooking of the connecting leads into the relevant hooks of the connecting elements, using the example of leads 94' and 95'. The latter are hooked into hooks $114^{IV}$ and $115^{IV}$ of connecting elements 114 and 115, respectively, and are welded to them by resistance welding as described below with reference to FIGS. 12 and 13.

FIG. 6 also illustrates a preferred implementation of the contact elements. As is evident from FIG. 6, contact elements 114″ and 115″ are each made up of two resilient press-in pins 182, 184 and 183, 187, respectively, which are described in detail below with reference to FIG. 11.

Figure 7:
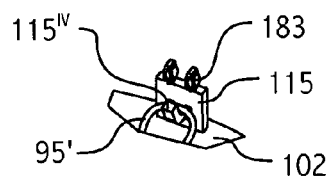
FIG. 7 is a perspective depiction, at a scale of approximately 1:1, of a portion of the stator of FIG. 5 having a connecting element, after winding of the winding arrangement.

FIG. 7 is a perspective depiction of a portion of the stator of FIG. 6 having connecting element 115, after winding and at a scale of approximately 1:1.

Figure 8:
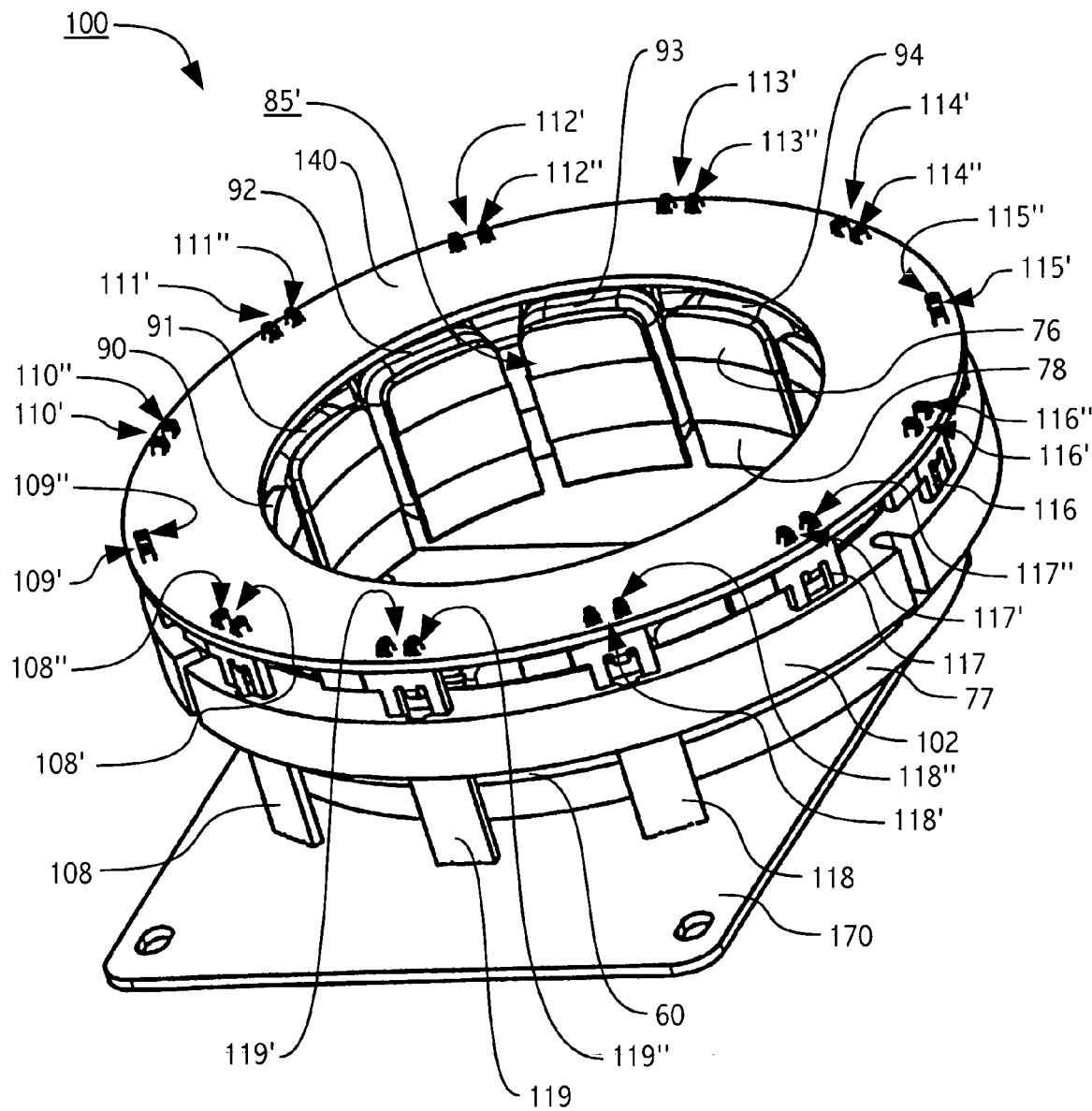
FIG. 8 is a perspective depiction of the stator of FIG. 5 after stacking.

FIG. 8 is a perspective depiction of the completely assembled stator 100 of FIG. 5.

FIG. 8 illustrates the mounting of connecting arrangement 140 on connecting elements 108 to 119 by way of contact elements 108″ to 119″ arranged in the associated receiving elements 108' to 119'. FIG. 8 also shows the mounting of connecting arrangement 170 on connecting elements 108, 118, and 119 via contact elements 108‴, 118‴, and 119‴ (not visible) arranged in the respective associated receiving elements 172, 174, and 176 (not visible).

For the manufacture of stator 100, firstly carrier 102, stator lamination stack 60, and the annular molded part 77 are arranged one above another, and connecting elements 108 to 119 are mounted in carrier 102. Winding arrangement 85' is then wound, in which context connecting leads 88' to 99' between the individual coils 88 to 99 are hooked into the associated hooks $108^{IV}$ to $119^{IV}$ (see FIG. 6). Leads 88' to 99' are then welded by resistance welding to the relevant hooks $108^{IV}$ to $119^{IV}$, as described with reference to FIGS. 12 and 13. Connecting arrangements 140 and 170 are then mounted on contact elements 108' to 119' and 108‴, 118‴, and 119‴, respectively.

Figure 9:
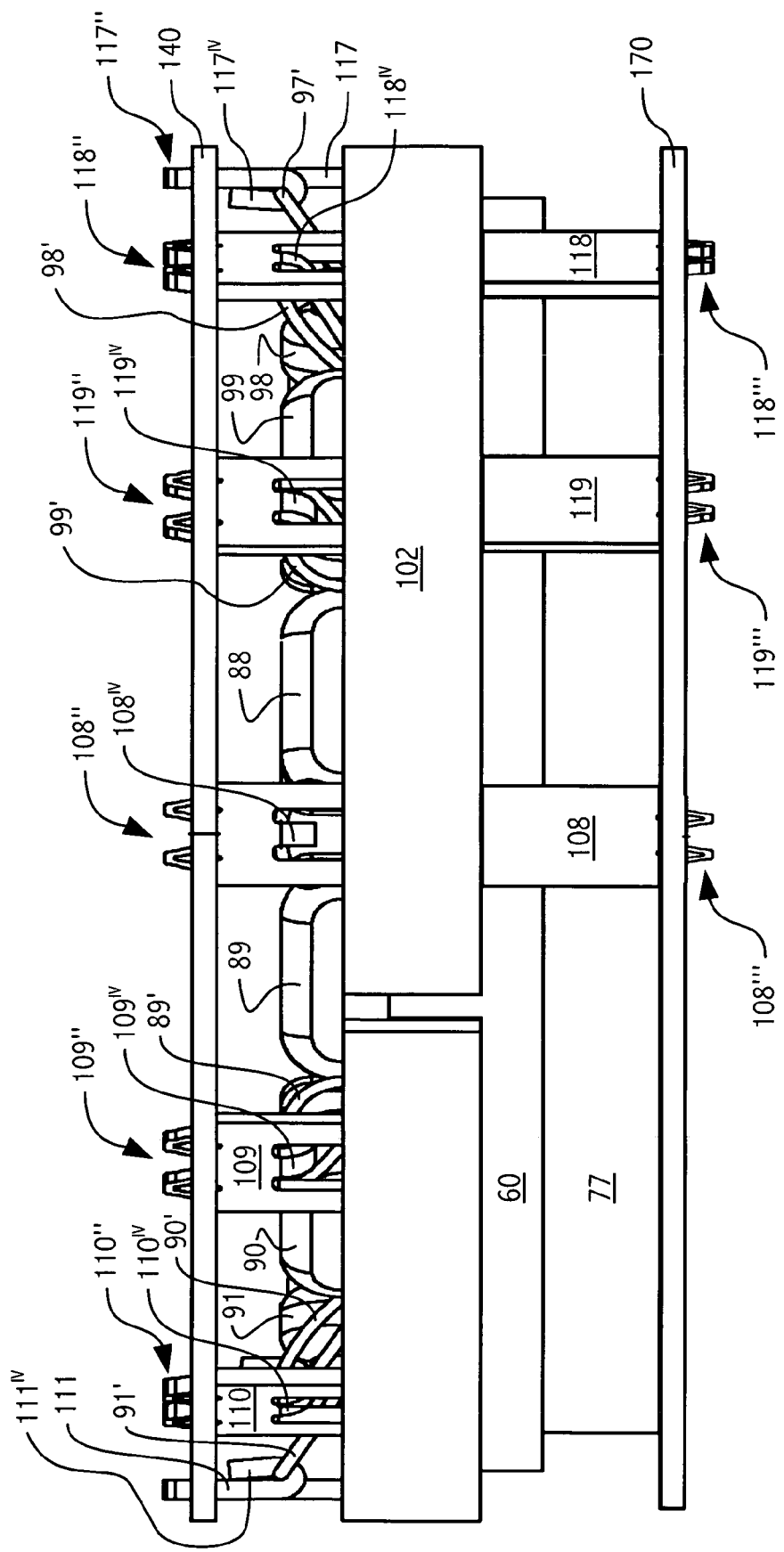
FIG. 9 is a schematic side view of the completed stacked stator of FIG. 8.

FIG. 9 is a schematic side view of the stator of FIG. 8 and the mounting of connecting arrangements 140 and 170 on connecting elements 108, 118, and 119, and the mounting of the connecting leads on their mounting elements, e.g. lead 97' on hook $117^{IV}$.

Figure 10:
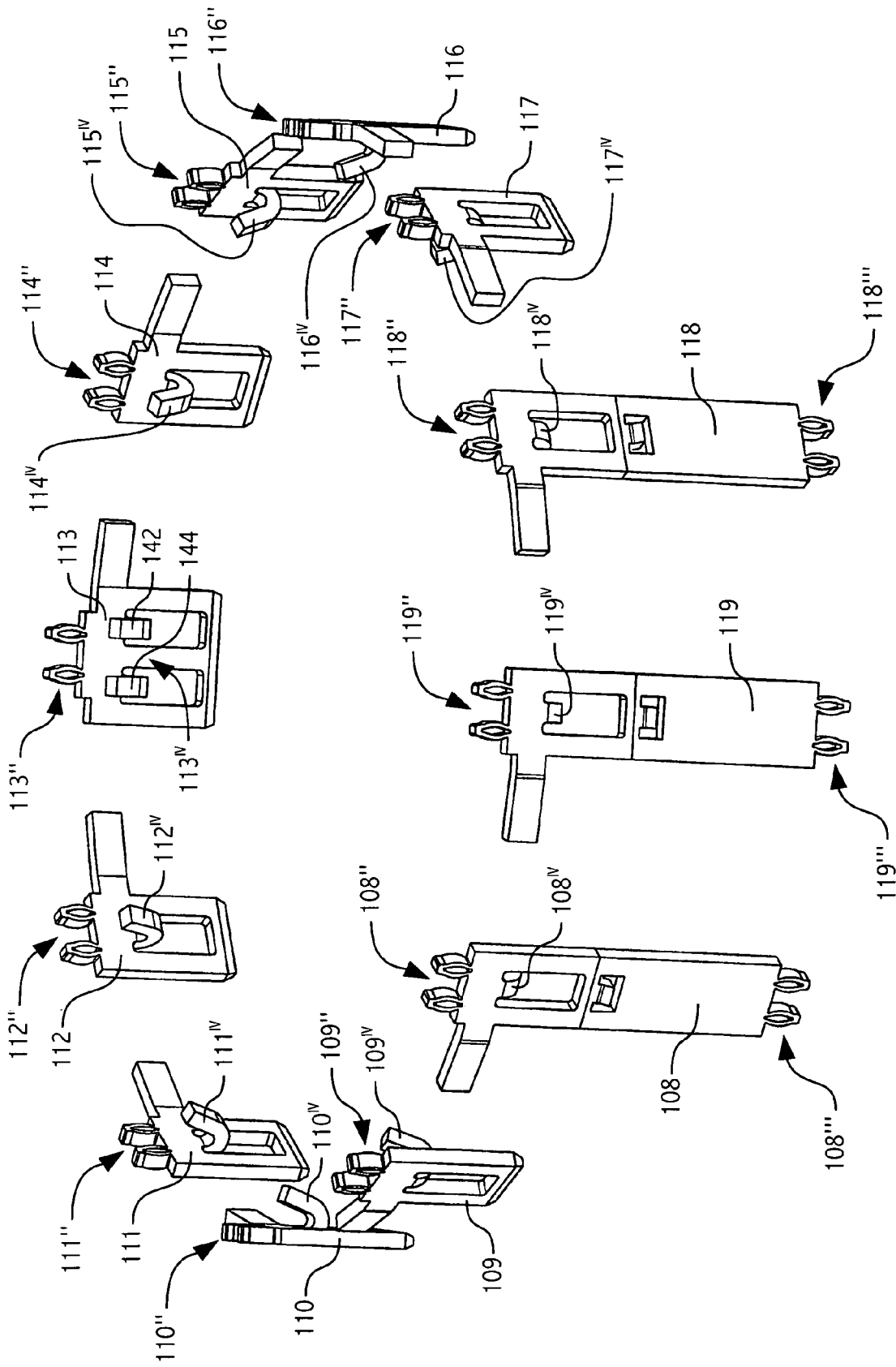
FIG. 10 is a perspective depiction of the connecting elements of FIG. 5.

FIG. 10 is a perspective view of connecting elements 108 to 119 of FIG. 5. A preferred implementation of connecting element 114 is shown greatly enlarged in FIG. 11 and described there. A preferred implementation of connecting element 108 is shown greatly enlarged in FIG. 14 and described there.

FIG. 10 illustrates the fact that only mounting element $113^{IV}$ of connecting element 113 has two hooks 142 and 144. As described with reference to FIG. 5, according to a preferred implementation of the invention, winding arrangement 85' is wound with a single winding wire. End 142' of this wire is mounted, for example, on hook 142 before winding. Coils 94 to 99 and 88 to 93 of FIG. 5 are then wound, and the other end 144' of the winding wire, coming from coil 93, is mounted on hook 144. The circuit is thus closed at hook 144, since the latter is electrically connected via connecting element 113 to hook 142.

As likewise illustrated in FIG. 10, only connecting elements 108, 118, and 119 have lower contact elements 108‴, 118‴, and 119‴, respectively, for connection to a corresponding supply voltage source, since three terminals are sufficient for connecting a three-phase motor.

Figure 11:
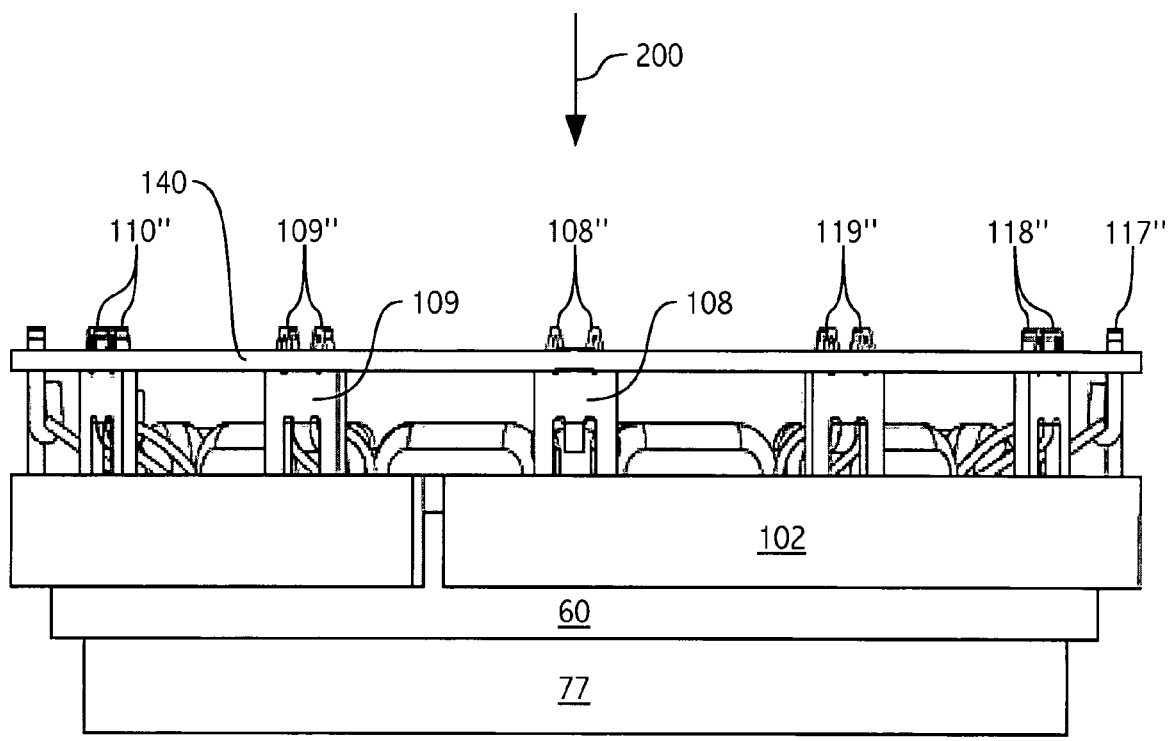
FIG. 11 is a depiction showing the installation of upper board 140 on the stator, the board being pressed on in the direction of an arrow 200.

FIG. 11 shows the assembly of circuit board 140 by pressing onto the contact elements in the direction of an arrow 200; this is usually followed by a soldering operation.

Figure 12:
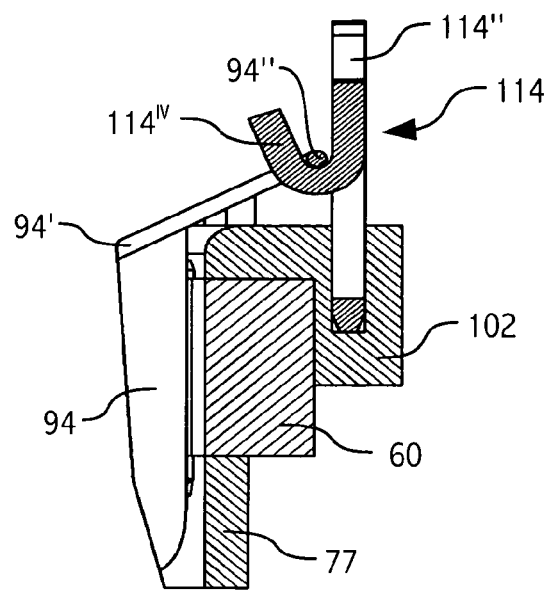
FIG. 12 is a sectioned view through the depiction of FIG. 6 along section line A-A.

FIG. 12 is a greatly enlarged sectioned depiction of hook $114^{IV}$ with a connecting lead 94' arranged therein, looking along section line A-A of FIG. 6. Lead 94' has lacquer insulation 94″.

Figure 13:
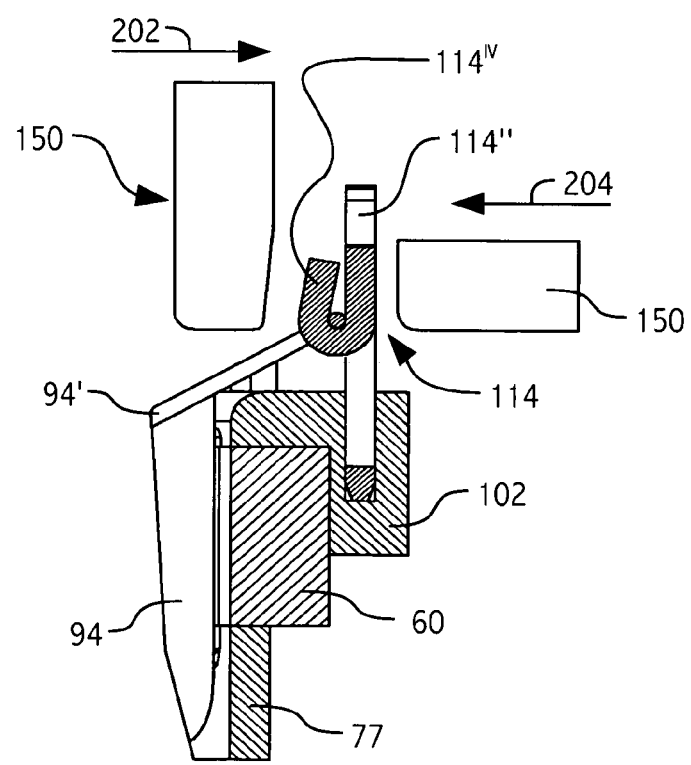
FIG. 13 is the sectioned view of FIG. 12 with an example of a pair of welding tongs, to illustrate a resistance-welding operation.

FIG. 13 shows a resistance welding procedure in which lead 94' is welded to a hook $114^{IV}$ using welding tongs 150 that are closed in the direction of two arrows 202, 204. For this purpose, welding tongs 150 are guided from above over element 114 and then brought horizontally against hook $114^{IV}$. The latter is bent together over lead 94' with the aid of welding tongs 150, and at the same time is heated by a current flowing through welding tongs 150. This current heats wire 94, and its insulation 94″ burns off. The result is that lead 94' is welded to hook $114^{IV}$, and a mechanically stable and electrically conductive connection is produced.

Figure 14:
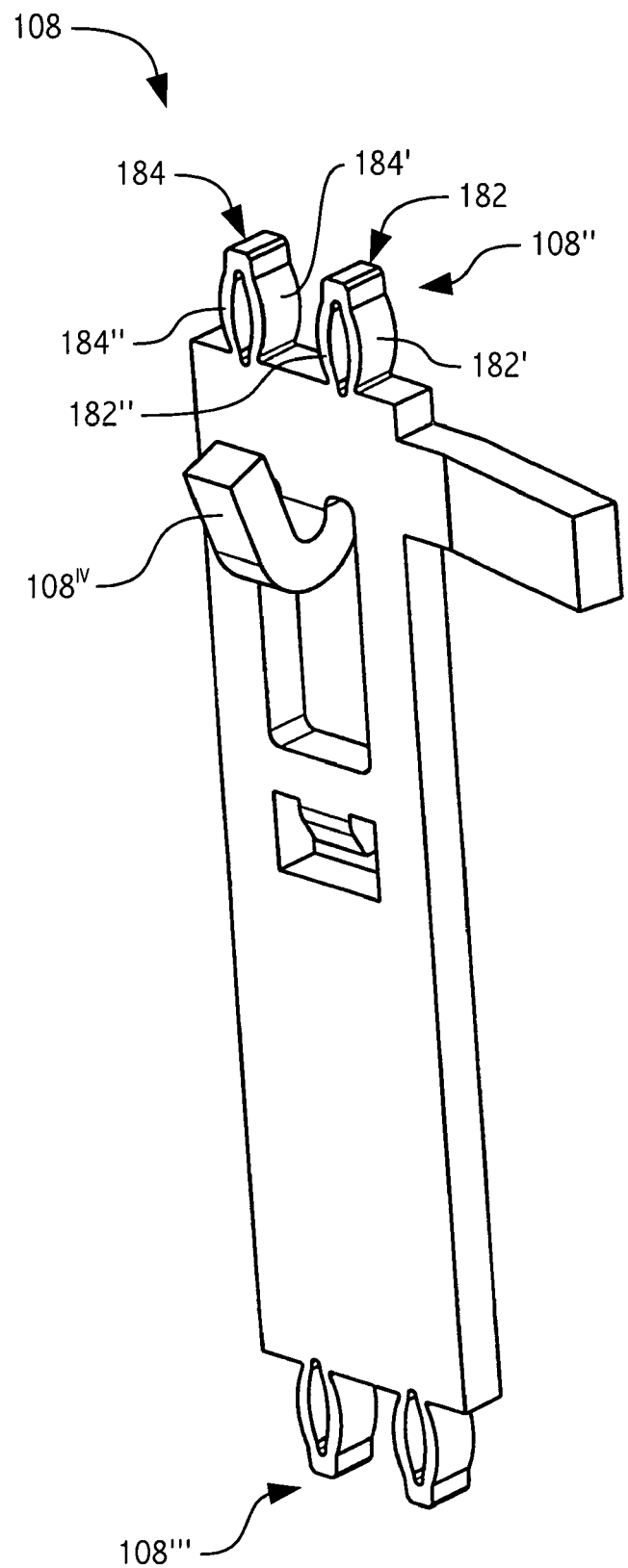
FIG. 14 is a perspective depiction of a further connecting element according to the present invention such as the one used in FIG. 5 and FIGS. 8 to 10.
Figure 15:
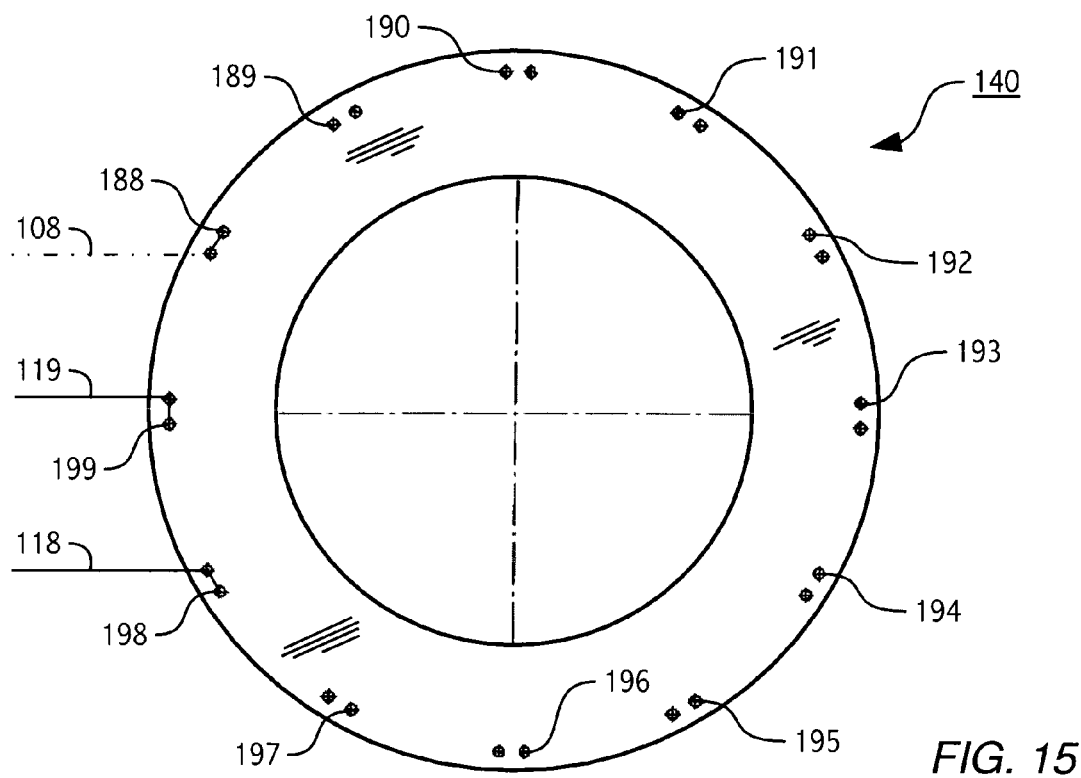
FIG. 15 is a plan view of a circuit board 140 used in the context of the invention.

FIG. 14 is a greatly enlarged perspective view of connecting element 108. This figure shows a preferred implementation of the contact elements as resilient press-in pins. These resilient pins, also called "press fits," each have two lateral flexural elements 182', 182″ and 184', 184″. When press-in pins 182, 184 are pressed into an associated opening of board 140, flexural elements 182', 182″ and 184', 184″ are compressed, i.e. flexural elements 182' and 182″ are pressed against one another, as are flexural elements 182' and 184″. As a result of the resilient movement of the flexural elements in mutually opposite directions, press-in pins 182, 184 are mounted in stable fashion. Electrical contact with a conductor path, as described below with reference to FIG. 15, is generated and maintained, in that context, by the resilient property of press-in pins 182, 184.

FIG. 15 once again shows circuit board 140 of FIGS. 5 and 8. It has twelve receiving elements 188 to 199 in the form of through-contacted hole pairs into which, as shown in FIG. 8, the various contact elements 108', 108″ to 119', 119″ are pressed, thereby creating the necessary electrical connections for the individual stator windings. A soldering operation is not required for this.

As in FIG. 8, connecting element 108 is connected onto receiving element 188, connecting element 119 onto receiving element 199, and connecting element 118 onto receiving element 198. These connecting elements are indicated only symbolically.

Figure 16:
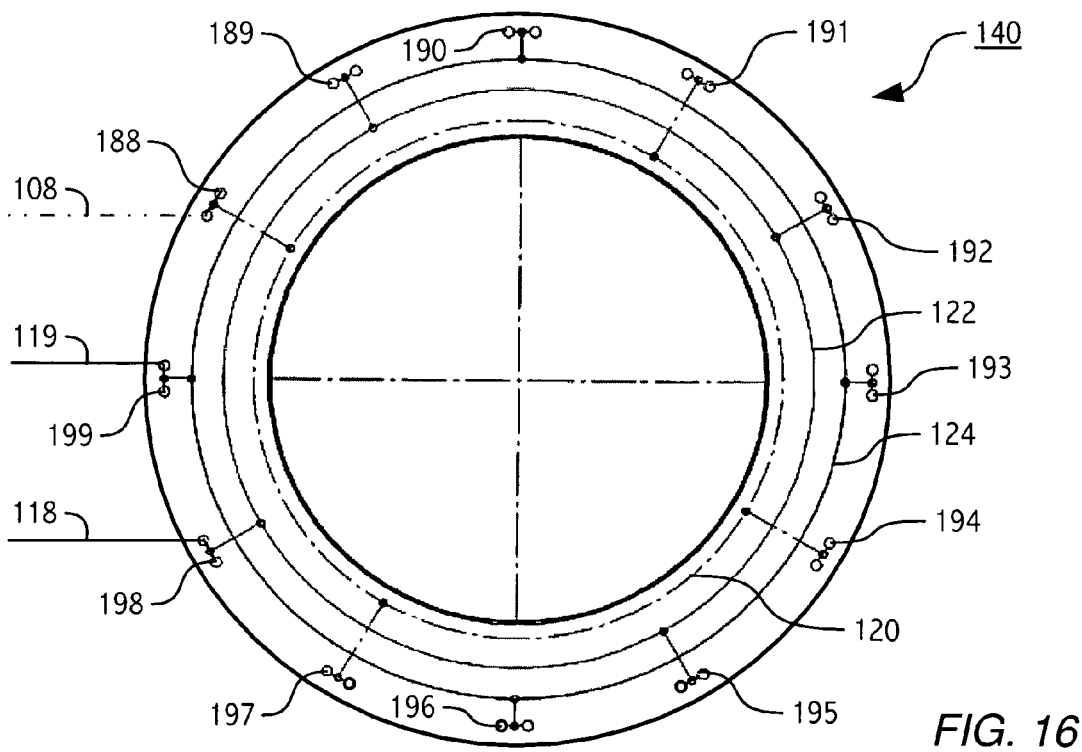
FIG. 16 is a schematic, exemplifying depiction of the conductor paths in circuit board 140 of FIG. 15.

FIG. 16 schematically shows the internal connections that are provided in circuit board 140 on different planes, and that preferably are completely embedded into circuit board 140.

A first internal annular lead 120 is connected to terminal 108 and, as depicted, is connected to receiving elements 188, 191, 194, and 197. This annular lead 120 can constitute the U phase.

A second internal annular lead 122, to which receiving elements 189, 192, 195, and 198 are connected, is connected to terminal 118. These elements can constitute the W phase.

A third internal annular lead 124, to which receiving elements 190, 193, 196, and 199 are connected, is connected to terminal 119. These elements can constitute the V phase.

The invention has been described above with the aid of exemplifying embodiments in order to facilitate comprehension by the skilled artisan. The invention can of course be varied in many ways. For example, in FIG. 16 it would be sufficient to arrange one of the three annular leads 120, 122, 124 in the interior of board 140. In this case a second annular lead can be arranged on the upper side of board 140, and in this case the third annular lead is arranged on the lower side of board 140. Such modifications, and similar ones, occur to the skilled artisan based on practical requirements, e.g. the number of phases, the number of stator poles, and the manner in which those stator poles are interconnected. It is particularly advantageous that a stator of this kind can be manufactured in large automated fashion, since the winding, as depicted e.g. in FIG. 1, can be wound continuously, and the electrical connections to the individual hooks can likewise be made automatically using welding tongs, whereupon the hooks can be electrically connected by means of circuit board 140 in the requisite manner. Instead of attaching the winding wires by welding the winding wires held in the hooks, the use of insulation displacement contacts is also possible.

What is claimed is:

1. An electric motor comprising
    a rotor (52) rotatable about a rotation axis (56);
    a stator (60) associated with said rotor (52), which stator is equipped with salient poles, on each of which is provided a respective winding, which windings (88 to 99) together form a winding arrangement (85'), electrical connecting leads (88' to 99') being provided between at least some of the windings (88 to 99);
    electrical connecting elements (108-119), arranged on at least one insulating carrier (102), that are equipped with contact elements (108" to 119") and with mounting elements (108"" to 119""), said mounting elements serving for electrical and mechanical connection to the connecting leads (88' to 99'), at least some of said connecting elements providing electrical interconnection between said winding arrangement (85') and a supply voltage source;
    a first circuit board serving as an electrical connecting arrangement (140) that is equipped with at least one electrical lead (120, 122, 124) and is formed with associated receiving openings (188 to 199) for contact elements (108" to 119") of at least two of said electrical connecting elements (108 to 119), in order to enable an electrical connection from the relevant connecting lead (88' to 99'), via the mounting element associated with said lead, the connecting element (108 to 119) associated with said mounting element, and at least one resilient contact element (108" to 119") provided on said connecting element, to the at least one lead (120, 122, 124) of the electrical connecting arrangement (140);
    a second circuit board (170) separated from and spaced a predetermined distance from said first circuit board (140), said second circuit board serving as a terminating member for electrical connection of said winding arrangement (85'); and wherein at least one of said electrical connecting elements includes a first subelement (108") configured to electrically connect to said first circuit board (140) and a second subelement (108'") configured to electrically connect to said second circuit board (170).

2. The motor according to claim 1, wherein
    the first circuit board serving as connecting arrangement is implemented as a printed circuit board (140), and
    the at least one electrical lead (120, 122, 124) is implemented as a conductive path of the board (140).

3. The motor according to claim 1 or 2, wherein
    the contact element of the connecting element is implemented as a press-in pin (108" to 119") for pressing into an associated receiving opening (188 to 199) of the first circuit board (140), in order to create an electrical connection to a lead provided in said receiving opening.

4. The motor according to claim 3, wherein
    each of said electrical connecting elements (108-119) comprises at least two resilient press-in pins (182, 184).

5. The motor according to claim 3, wherein
    an associated receiving opening (188 to 199) in the first connecting arrangement (140) forms a press-in seat for an associated resilient press-in pin (182, 184).

6. The motor according to claim 1, wherein
    the contact element of the connecting element is implemented as a so-called press fit (182, 184).

7. The motor according to claim 6, wherein
    an associated receiving element is implemented as a receiving opening (188 to 199) for receiving an associated press fit (182, 184).

8. The motor according to claim 1, wherein
    at least one winding (88 to 99) of the winding arrangement is wound from wire, and
    the mounting element (114) of a connecting element is configured to form a receiving trough so that, during a winding operation, it enables placement of the winding wire (94") into said mounting element.

9. The motor according to claim 8, wherein
    the winding wire (94', 94") is welded to said mounting element (114) by an electrical resistance weld.

10. The motor according to claim 1, wherein
    the insulating carrier (102) is arranged on the stator (60).

11. The motor according to claim 10, wherein
    parts (76) of coil formers for the windings of the stator (60) are provided on the insulating carrier (50).

12. The motor according to claim 1, wherein
    the windings consist essentially of a single continuous strand.

13. The motor according to claim 1, wherein
    the stator (60) comprises at least six poles (11'-16').

* * * * *